United States Patent Office 2,951,049
Patented Aug. 30, 1960

2,951,049

THE USE OF DIGLYCIDYL COMPOUNDS IN IMPROVED METHODS FOR PREPARING ALKYD RESINS

William Kammerer, Jr., Bethesda, Md., assignor to American Cyanamid Company, New York, N.Y., a corporation of Maine No Drawing. Filed Apr. 12, 1957, Ser. No. 652,341

13 Claims. (Cl. 260—22)

This invention relates to an improved process for the production of alkyd resins. This invention in particular relates to an efficient method of preparing alkyd resins by reacting preformed alkyd resins having relatively high acid number and short polymer length with epoxide alkyl ethers of polyhydric alcohols or epoxide alkyl esters of polycarboxylic acids.

One of the objects of the present invention is to provide an economical method for the production of alkyd resins. Another object is to produce oil-modified or unmodified alkyd resins in an efficient manner whereby time and temperature requirements are materially reduced over that required in the present existing procedures for the commercial production of these types of resins. A further object of this invention is to prepare given alkyd resin types in a novel, efficient manner whereby the ultimate chemical compositions do not materially differ from the same type of resin made by the conventional processing procedures.

A still further object is to provide a time-saving method for producing alkyd resins without sacrificing any of the desirable properties inherently associated with any given type.

These and other objects of this invention will be more fully understood from the discussion and the specific examples set forth hereinbelow.

Alkyd resins are widely used as film formers in surface-coating applications. These applications include decorative and protective coatings for a large number of industrial and architectural items. They comprise the bulk of the resins used for this purpose. Currently, alkyd resins account for approximately fifty percent of the total production of surface-coating resins. As a film-forming material, convertible alkyd resins, that is, resins that dry to an infusible state by means of an air oxidation process, are adhesive, flexible, tough, durable and extremely versatile with regard to application techniques. Non-convertible or thermoplastic types, on the other hand, find wide use as plasticizers. Alkyd resins are tremendously important in the surface-coating field because they possess the above-mentioned desirable properties at comparatively reasonable cost.

An alkyd resin can be defined as a polyester resulting from the reaction of a dibasic organic acid with a polyhydric alcohol. An oil-modified alkyd is a complex condensation product of a dibasic organic acid, a polyhydric alcohol or a mixture of polyhydric alcohols having an average of greater than two available hydroxyl groups per molecule, and a monobasic acid which is usually a higher fatty acid derived from vegetable or animal oils.

The conventional method for preparing alkyd resins consists of reacting the above-stated components in bulk at elevated temperatures, in the range of from about 200° C. to about 260° C. A properly formulated alkyd resin requires a considerably long reaction cycle ranging in commercial practices from about eight to twenty hours depending on the type of resin, that is, the extent to which it is modified with monobasic acids, the nature of the fatty acids employed, the functionality of the polyol used, among other factors. The quality expected today in these type resins necessitates expensive equipment installations and constant personnel supervision. These factors, particularly the latter, account for the significant portion of the overall cost for producing these resins. Since raw material costs are, at any given time, relatively fixed, the only practical manner of effecting economies is to reduce the reaction cycles normally required.

The desirability of reducing to a minimum the processing time required for alkyd resin preparation has been of ever-existing concern to alkyd resin manufacturers. As a consequence, a number of techniques or types of processing procedures have been employed heretofore which to some extent have been reasonably successful.

One of the more prevalent procedures is the so-called solvent process which is disclosed in Patent No. 2,308,498. The process disclosed therein applies the principle of azeotropic distillation to the commonly employed fusion process. The condensation is carried out in the presence of a water-immiscible solvent capable of forming azeotropic mixtures with water vapor, the commonest solvent used being xylol. The process is carried out by maintaining a certain amount of solvent in the reaction mixture usually accomplished by employing a condenser provided with a lateral overflow so that the solvent boiled off with the water is continuously returned to the reaction vessel. One of the attendant advantages of this process modification is that reaction times required to processing certain types of alkyd resins are reduced. Unfortunately, however, this effect is only pronounced in short or medium oil-modified resins. In resins containing an appreciable amount of monobasic modifiers, that is, alkyd resins approaching a linear configuration, and which inherently require considerable time at processing temperatures the saving of time is negligible if not in many cases nonexistent.

It is well-known to those skilled in the art that sparging a resin with an inert gas such as nitrogen or carbon dioxide during its cooking cycle will aid in a removal of the water of esterification. Efficient removal of this water of esterification will tend to hasten the reaction rate. However, the disadvantage of this technique is that other volatiles are lost. For example, when phthalic anhydride is employed as the dibasic acid constituent the loss of said ingredient is appreciable in an efficient sparging procedure, thereby clogging up the reaction vessel's vent pipes and reducing the yield.

Other methods known to those skilled in the art comprise the use of higher reaction temperatures and esterification catalysts. These expedients among others, however, are quite limited in application because of disadvantages arising from their employment. For example, one of the disadvantages resulting from the use of very high esterification temperatures is undue degradation of color regardless of the care that may be taken to exclude oxygen from the reaction vessel. Also, the use of catalysts often adversely affects the siccative properties of the finished resin product or may present problems in regard to their removal from the finished product if they be incompatible with the product.

The present invention consists of a new method of forming alkyd esterification bodies in a minimum of processing time without the disadvantages of any of the practices of the prior art, some of which are mentioned hereinabove.

Applicant's novel process, stated generally, consists of two basic steps. Firstly, that of pre-forming any given alkyd resin composition, whether it be a short, medium or long oil-type alkyd with a substantial deficiency of hydroxyl groups. It is contemplated in this invention, that such a formulated resin will be reacted in the initial esterification or pre-forming step so that the hydroxyl groups of the hydroxyl-bearing component or components will be substantially completely reacted to form ester linkages with the available organic acidic components. Secondly, reacting this pre-formed resin or initial esterification product with an oxirane compound which may be a glycidyl ester of a polycarboxylic acid or a glycidyl ether of a polyhydric alcohol. Preferably, the oxirane compounds to be employed are diglycidyl esters of dicarboxylic acid and diglycidyl ethers of alkane diols respectively.

While applicant's process has been characterized as a two-step process, it is to be understood that these steps are contiguous ones, employing existing conventional reaction vessels with the result that overall processing time and thermal or heat requirements are materially less than that required in the heretofore processing practices. The advantages accruing from the practice of applicant's process will be more fully shown hereinbelow.

In the initial esterification step resulting in the preformed alkyd bases contemplated in this invention the reaction rate is exceedingly rapid or more correctly stated, the time required to completely react the hydroxyl groups contained in the reaction mixture is very rapid, that is, the utilization of hydroxyl groups is exceedingly more rapid than is the case when there is a stoichiometric relationship between carboxyl and hydroxyl groups of the resin-forming components. Such a pre-formed resin composition or initial esterification product contemplated in this invention will generally be unsuitable as such as a film former. The characteristic of the pre-formed resins contemplated in this invention are short-chain linear polymers or polymers having a minor amount of cross-linking and in each instance the pre-formed polymer will contain terminal carboxyl groups, that is, an unreacted group of the particular dibasic carboxylic acid employed to prepare the pre-formed alkyd. In order to obtain a usable alkyd composition a requisite amount of an oxirane compound is then added to the initial esterification product and reacted therewith at temperatures considerably below those normally required for the usual esterification procedures. The temperature range suitable for the reaction of the oxirane compounds with the pre-formed bases is from about 130° C. to 260° C., the preferred range being from about 150° C. to 200° C. As mentioned previously, the preferred oxirane compounds that may be employed are diglycidyl esters of dicarboxylic acids or diglycidyl ethers of alkane diols or mixtures thereof. Upon the addition of the oxirane compound, there is a rapid reduction of acidity and correspondingly rapid build-up of desired polymer structure. At this stage in the prior art practices for preparing most alkyds the time-acid number relationship asymptotically approaches the low acid number ranges and the degree of polymeric structure which are required for most surface-coating resins. It is this time-consuming phase of the conventional processes which is obviated by applicant's process.

While the reaction of an oxirane group with a carboxylic acid group is fundamentally an esterification step, nevertheless, such a reaction occurs much more rapidly than when a carboxylic acid group is esterified with a hydroxyl group. It is this comparatively rapid condensation of the available carboxyl groups of the pre-formed alkyd base with the oxirane groups of the glycidyl compounds introduced at this point which accounts for the overall comparative rapidity in obtaining the desired end product. In other words, if at the point in applicant's process where it is preferred to introduce the glycidyl compound, a hydroxyl compound equivalent in functionality to the glycidyl compound were introduced instead, the condensation of the carboxyl groups will be tediously slow in the low temperature range preferred for this phase of applicant's process. On the other hand, if this hydroxyl equivalent of the oxirane compound were added at the same point in regard to the acid number range where applicant prefers to add the glycidyl compound but at a high esterification temperature, for instance about 250° C., the overall time required to obtain the desired end product would be substantially the same as where this added hydroxyl bearing compound were incorporated in the reaction mixture from the start as manifest in the conventional processing method.

In this connection, it is noteworthy to mention that the time-saving results of applicant's novel process are not realized if the contemplated amounts of glycidyl compound of the present invention were employed in the initial reaction mixtures. Therefore, it is not the mere use but rather the judicious employment of the glycidyl compounds which accomplishes the desired results of the present invention. The specific examples outlined hereinbelow will best serve to show those skilled in the art how to practice this detail of applicant's process.

The amount of glycidyl compound to be employed in this invention is of necessity somewhat of a variable. A convenient criterion for determining this amount is the acid number of the particular pre-formed esterification product. On this basis, a suitable amount is an equivalent of oxirane oxygen per equivalent of free carboxyl groups existing in the pre-formed resin. It must be understood that this method is necessarily to be a flexible one. For example, when one is employing a pre-formed esterification product having an acid number in the upper portion of applicant's preferred range, and it is desired to maintain a certain maximum free hydroxyl content in the final resin, then it may be desirable to use somewhat less than an equivalent of oxirane oxygen per equivalent of free carboxyl groups. Conversely, when a pre-formed resin is employed having an acid number in the lower portion of applicant's preferred range, then conceivably it may be desirable to use an amount of glycidyl compound representing greater than one equivalent of oxirane oxygen for an equivalent of free carboxyl groups. Therefore, with this consideration in mind, the amount of glycidyl compound that can be employed advantageously in applicant's process may vary over the range from about 0.5 to 1.5 equivalents of oxirane oxygen per equivalent of free carboxyl groups contained in the pre-formed esterification product.

While the preferred oxirane compounds to be used in applicant's process contain two epoxide groups per molecule which are equivalent to four functional groups, actually only essentially two of these ultimate functional positions are employed in this step wherein the pre-formed resin is reacted with the oxirane compound. However, this use of the oxirane compound is sufficient to yield a final resin having requisite polymeric structure. By incomplete use of all the functional groups of the added oxirane compound, resins prepared by applicant's process will necessarily have or contain free hydroxyl groups. This condition was alluded to above. However, this is in accordance with alkyd formulation practices. Most alkyd resins are formulated with an excess of hydroxyl groups over that required by the carboxyl groups of the acidic components. This practice has primarily a two-fold purpose. Firstly, that of reducing somewhat the processing time required for longer oil alkyds and secondly, that of hindering undue cross-linking in the shorter oil-modified resins. Actually, the presence of hydroxyl groups in the polymeric structure imparts beneficial properties to the resin. For example, the presence of hydroxyl groups in an alkyd resin makes such a resin more compatible with the amino-type resins often used in conjunction therewith. These groups also contribute to solvent resistance of a cured film.

It will be noted in the specific examples contained herein that the free hydroxyl content of any given type of resin prepared by applicant's process is substantially the same as that in a comparable type resin prepared by prior art processes. Also, these compositions are practical formulations finding prevalent use in surface coating applications.

In the preparation of the pre-formed alkyds, standard processing procedures as known in the art may be used, that is, either the so-called fusion method may be employed wherein the resinifying components are charged to the reaction vessel and heated at esterification temperatures under an inert gaseous atmosphere, or the solvent process referred to hereinabove may be employed. Esterification temperatures for this stage of the process may vary over the range from about 200° C. to about 280° C.

When the object is to prepare an oil-modified alkyd by applicant's process, the oil or monobasic fatty modifier may be incorporated in the pre-formed polyester by either incorporating in the initial resin charge the desired fatty acids or a suitable partial ester of a polyol such as monoglycerides and alcoholysis products resulting from the reaction of an oil with a polyhydric alcohol containing at least three hydroxyl groups.

In the preparation of the oil-modified pre-formed alkyds to be used in this instant invention, one may use drying, semi-drying or non-drying glyceride oils. Examples of these are such oils as linseed, dehydrated castor, sunflower seed, rubber seed, hemp seed, safflower, fish, soya, corn, peanut, walnut, tobacco seed, cotton seed, coconut and the like. One may also use tall oil fatty acids, synthesized fatty acids such as pelargonic, capoic and the like, or, any of the fatty acids derived from the oils mentioned above. In accordance with common practice, fatty acids may be used in combination with the glyceride oils and various combinations of the different oils may be employed. These oil materials may be used in amounts sufficient to produce short, medium or long oil modified alkyd resins.

In the preparation of the pre-formed alkyds contemplated in this invention one may use the saturated polycarboxylic acids or the unsaturated polycarboxylic acids. Among those saturated polycarboxylic acids, i.e. those which are free of non-benzenoid unsaturation, which may be used in the practice of this process of this invention are succinic, sebacic, adipic, pimelic, suberic, azelaic, succinic and phthalic, and tetrahydrophthalic. Additionally, one may use such unsaturated acids as maleic, fumaric, itaconic, aconitic and the like up to about 10% based on total polycarboxylic acid. In the preparation of oil-modified resins it is commonly desirable to use those unsaturated dibasic acids in small amounts in combination with saturated dibasic acids. These acids, and other comparable acids and their anhydrides may be used in the preparation of these pre-formed alkyd resins. Obviously, these acids may be used either singly or in combination with one another.

In the preparation of the pre-formed alkyd resins, the conventional polyhydric alcohols may be used such as ethylene glycol, diethylene glycol, dimethylene glycol, tetramethylene glycol, trimethylolpropane, trimethylolethane, manitol, dulcitol, sorbitol, glycerine, pentaerythritol, dipentaerythritol, and the like. The polyhydric alcohols may be used either singly or in combination with one another in the esterification reaction in the preparation of the pre-formed alkyd resins.

The amounts of polycarboxylic acid and polyhydric alcohol used may readily be calculated on a stoichiometrical basis in such a way that when esterification is substantially completed in the first step there are substantially no remaining free hydroxyl groups and the acid number is between 15 and 50.

As mentioned previously, the basic concept of applicant's process theoretically applies to all types of alkyd resins. However, it should be appreciated that there is a small segment of resin types coming under the broad classification of alkyds wherein the instant process may not be indiscriminately applied. For example, in the preparation of an unmodified phthalic pentaerythritide resin, the need to shorten the processing cycle is nonexistent. As a matter of fact, the problem becomes one of lengthening the inherently short cycle so as to have adequate control in obtaining a useful final product of this type. Similarly, the use of such dibasic acids as terephthalic and to somewhat lesser extent isophthalic presents special problems well known to those skilled in the art in preparing alkyd resins wherein polyhydric bodies having a functionality greater than diols are employed.

The art of formulating alkyd resins, needless to say, is vast. Consequently, the ramifications of applicant's process are correspondingly vast. However, the examples contained hereinbelow will serve to show those skilled in the art the best mode of practicing the present invention.

The term "acid number" which is used hereinbefore and in the examples that follow is essentially a method of characterizing the amount of uncondensed carboxyl groups existing in the resin. The acid number of a resin is defined as the number of milligrams of potassium hydroxide which are required to neutralize one gram of the resin. These examples are given by way of illustration and not by way of limitation. All parts are by weight unless otherwise stated.

GLYCIDYL ESTER PREPARATIONS 198 parts of dipotassium phthalate and 277.6 parts of epichlorohydrin are introduced in a suitable reaction chamber and heated at 105–110° C. for one to two hours with a quaternary ammonium salt as catalyst. The potassium chloride produced is removed either by filtration or washing with water. The excess epichlorohydrin is stripped under vacuum and the resultant product is diglycidyl phthalate. In order to obtain a purer grade, the diglycidyl phthalate so produced may be further subjected to distillation procedures. In such a manner, diglycidyl phthalate may be obtained having an oxirane content in the order of about 90% of the theoretical value.

Quite obviously, in the preparation of the glycidyl esters of polycarboxylic acids, one may use any of the reactive halo-hydrins such as epibromohydrin, epiiodohydrin, epifluorohydrin and the like. As the other reactable compound, one may use alkali and alkali earth salts of polycarboxylic acids such as potassium, lithium, calcium, barium and the like.

Any polybasic carboxylic acid may be used either saturated or unsaturated. Examples of saturated carboxylic acids are adipic, sebacic, succinic, azeleic, suberic, pimelic, phthalic, tricarballylic, trimesic and the like. Among the unsaturated polycarboxylic acids that may be employed are fumaric, maleic, itaconic, aconitic and the like.

Alternately, one may employ the procedure disclosed in Patent 2,448,602 for the preparation of diglycidyl esters of carboxylic acids which may be employed in the present invention.

GLYCIDYL ETHER PREPARATION

The glycidyl ethers employed in this invention may be conveniently prepared by the reaction of a polyhydric alcohol and epichlorohydrin. For example, in the preparation of the diglycidyl ether of 2-ethyl-2-butyl, propanediol-1,3, the said glycol may be condensed with an excess of epichlorohydrin in the presence of concentrated sulfuric acid as a catalyst to form the diether. The acid catalyst may be neutralized with barium carbonate or other alkali and removed by filtration. The excess of epichlorohydrin may be removed by distillation. The addition compound can then be treated with caustic solution in water at room temperature, whereby it is converted into the epoxy compound. For purification purposes, the epoxy compound may be further distilled.

Among the compounds which may be employed in this procedure are ethylene glycol, propylene glycol, trimethylene glycol, 1,4-butanediol, 1,3-butanediol, 2,3-butanediol, 1,5-pentanediol, 2,4-pentanediol, 1,6-hexanediol, 2,5-hexanediol, 2-methyl-2,4-pentanediol, and 2-ethyl, 2-butyl propanediol-1,3, trimethylol propane, trimethylol ethane, pentaerythritol, dipentaerythritol, sorbitol and the like. When using the high functional polyols one may desire not to convert all the hydroxyl groups. This may be accomplished by adjusing the amount of epihalohydrin to be condensed therewith.

In the practice of the process of the present invention, it is not imperative that a solvent be used, although for some purposes it may be desirable to make use of a solvent, such as any of the conventional organic solvents used in the coating resins industry and in particular, in alkyd resin manufacture, of which a great plurality are well known in the art. If one elects to use a solvent, the amount can be varied according to the ultimate end use of the product, the solids content desired, the viscosity and the like.

In order that the present invention may be more completely understood, the following examples are set forth in which all parts are parts by weight unless otherwise indicated. These examples are set forth primarily for the purposes of illustration and any specific enumeration in detail contained therein should not be interpreted as a limitation in the case except as is indicated in the appended claims.

Example 1

This example illustrates the use of diglycidyl phthalate to prepare a long-oil architectural-type alkyd.

Into a suitable reaction vessel equipped with stirrer, vent pipe and means for introducing an inert gas through and over the reaction mixtures are charged 128 parts phthalic anhydride, 120 parts of refined soya oil, 230 parts soya fatty acids, and 78 parts pentaerythritol. This mixture is heated to 250° C. with stirring and under a nitrogen atmosphere. Heating is continued until an acid number of 26 is obtained. This value coincides with substantial utilization of the available hydroxyl groups. The temperature of the resin is then lowered to 170° C. and 38 parts of diglycidyl phthalate are added. The reaction is continued at 170° C. until an acid number of 6, color of 5 and viscosity of Z at 70% resin solids in Varsol No. 1 (Esso Standard Oil Company; a high-boiling aliphatic petroleum hydrocarbon of low kauri-butanol value) are obtained. The viscosity values referred to in this example and in the following examples are of the Gardner-Holdt bubble viscosity system determined at 25° C. The color values are given in terms of the Gardner (1933) color system.

A comparable resin to the above made in accordance with conventional practice is illustrated by the following procedure. Into a suitable reaction vessel are charged 360 parts refined soya oil, and 80 parts pentaerythritol. These components are heated to 230° C. whereupon .4 part litharge is added and heating continued until there is completion of a suitable alcoholysis product which is indicated by the obtainment of a clear solution when 1 volume of product is diluted to 10 volumes with ethyl alcohol. Following the alcoholysis of the soya oil, 148 parts phthalic anhydride are added. The reaction mixture is heated to 245° C. and held for an acid number 4, viscosity Z to Z-1 at 70% solids in Varsol No. 1 and color 5.

The total time for processing the type resin of this example by the conventional process is nine hours. The time referred to is the time "at heat" and disregards the heat-up time and the time required to form the alcoholysis product. In comparison, the total "at heat" time required to prepare this type resin by the process of this invention is four and one-half hours of which two hours were consumed in obtaining the indicated acid number value of the pre-formed resin. In this and the following examples comparison of processing times are the compared processing procedures for equal size batches of resin.

It will be noted that the composition of the above resins are substantially the same, that is, the percent phthalic anhydride, the percent oil acids and the percent excess OH are substantially identical for both resins. Drying tests conducted on thin films of the above resins containing the usual amounts of drying catalysts indicated no significant difference in this property between the two resins.

Example 2

This example illustrates the preparation of a long-oil alkyd similar to that of Example 1, however, the preformed resin in this instance is formulated to have a lower acid number thereby requiring a lesser quantity of diglycidyl phthalate to yield the desired end product.

Into a suitable reaction vessel equipped as in Example 1 are charged 135 parts phthalic anhydride, 100 parts refined soya oil, 144 parts refined soya fatty acids, and 76 parts pentaerythritol. This mixture is heated with agitation and under an inert atmosphere to 250° C. in one hour whereupon 110 parts refined soya oil are added. A temperature of 250° C. is regained and held until an acid number 17 is obtained. The resin is then cooled to 180° C. and 25 parts of diglycidyl phthalate are added. Reaction is continued at 180° C. until an acid number of 6.5 viscosity Z at 70% solids in Varsol No. 1 Gardner-Holdt at 25° C. and color 5 at 70% in Varsol (Gardner 1933) No. 1.

The total time for processing, that is, the total time "at heat" was six and one-half hours. This time compares with the nine hours required to process a similar resin made by the conventional process as shown in Example 1.

Example 3

This example further illustrates the preparation of a long-oil alkyd employing the use of diglycidyl phthalate.

Into a suitable reaction vessel equipped as in Example 1 are charged 330 parts safflower oil and 48 parts pentaerythritol. This mixture is heated to 230° C. with agitation and under a nitrogen atmosphere. At this temperature transetherification is obtained by using the usual amount of litharge as catalyst. 128 parts of phthalic anhydride are then added and the temperature is raised to 250° C. This temperature is held until an acid number 36 is obtained. The resin is then cooled to 190° C. and 38 parts of diglycidyl phthalate are added. The reaction is continued until an acid number 10, viscosity Z at 60% solids in Varsol No. 1 are obtained. The total time required for processing this resin was five hours, of which one and one-half hours was required to process the preformed resin and three and one-half hours at the lower indicated temperature following the addition of the diglycidyl phthalate.

A similar resin made by the practice of the prior art is obtained by charging into a suitable reaction vessel 330 parts safflower oil, 48 parts pentaerythritol, and 25 parts glycerine. A suitable alcoholysis product is obtained in the manner as given above. Whereupon, 148 parts phthalic anhydride are added and the resin mixture held at 240° C. until an acid number 8, viscosity Z to Z-1 at 60% solids in Varsol No. 1 are obtained.

The total time required at 240° C. to process the latter resin of this example was seven and one-half hours.

Example 4

This example illustrates the preparation of a linear phthalic-glyceride modified with linseed fatty acids.

Into a suitable reaction vessel are charged 135 parts phthalic anhydride, 286 parts linseed oil monoglyceride, and 64 parts linseed oil. This mixture is heated to 260° C. with agitation and under an inert atmosphere. The resin mixture is held at the indicated temperature until an acid number 24 is obtained. The resin is cooled to 160° C. and 25 parts diglycidyl phthalate are added.

Heating is continued at 160° C. until an acid number 7, viscosity X at 70% in Varsol No. 1 and color 8—9 at 70% in Varsol No. 1 are obtained. The processing time required here amounted to five and one-half hours.

A similar resin prepared by the conventional process illustrated by the following procedure. Into a suitable reaction vessel are charged 148 parts phthalic anhydride and 365 parts linseed oil monoglyceride. This mixture is heated to 260° C. and held there for an acid number 6, viscosity X to Y at 70% in Varsol No. 1 and color 9 at 70% in Varsol No. 1. The total time required at 260° C. by this method was ten hours.

*Example 5*

This example illustrates the use of diglycidyl phthalate to prepare a medium oil alkyd. Into a suitable reaction vessel equipped as in Example 1 are charged 250 parts phthalic anhydride, 388 parts soya oil monoglyceride, 140 parts dehydrated castor oil, and 23 parts glycerine. The resin mixture is heated to 250° C. with agitation and under an inert atmosphere and held there for an acid number 32. The time required at 250° C. was one and one-half hours. The resin was then cooled to 170° C., whereupon, 86 parts of diglycidyl phthalate were added. Heating was continued until an acid number 8, viscosity W at 50% in Varsol No. 1 was obtained. The time required at 170° C. was two hours making a total processing time of three and one-half hours.

A similar type resin made by prior art practice required a total time of six hours at 235° C.

*Example 6*

This example illustrates the use of diglycidyl phthalate to prepare a medium-short modified alkyd.

Into a suitable reaction vessel equipped as in Example 1 are charged 130 parts phthalic anhydride, 181 parts soya fatty acids, 34 parts ethylene glycol, and 37 parts pentaerythritol. This mixture is heated to 250° C. with stirring and under an inert atmosphere and held at this temperature until an acid number 33 is obtained. Time required at 250° C. was one and one-half hours. The resin was then cooled to 180° C. and 34 parts diglycidyl phthalate were added. Heating was continued until an acid number 7 and viscosity Z–1 at 50% solids in Varsol No. 1 were obtained. The time required at the reduced temperature was four hours, making a total processing time of five and one-half hours.

A similar resin by conventional processing practice is obtained by alcoholizing 190 parts soya oil with 37 parts pentaerythritol, then adding 148 parts phthalic anhydride and 34 parts ethylene glycol. The addition of said phthalic anhydride will lower the temperature to below 200° C. allowing for the safe addition of the glycol. The resin is then heated cautiously to 235° C. and held there for an acid number 7, viscosity Z–1 at 50% in Varsol No. 1. The total time required at 235° C. was nine and one-half hours.

*Example 7*

This example illustrates the use of the diglycidyl ester of azelaic acid to prepare an unmodified thermoplastic seam-sealing type alkyd resin.

Into a suitable reaction vessel equipped as in Example 1 are charged 188 parts azelaic acid and 100 parts diethylene glycol. This mixture is heated with agitation and under an inert atmosphere to 210–220° C. using an air-cooled reflux condenser. Heating is continued at the indicated temperature range until an acid number 24 is obtained, whereupon, 11.5 parts of the diglycidyl ester of azelaic acid were added. Heating is continued until an acid number 5 and viscosity Z to Z–1 at 75% solids in ethyl acetate are obtained.

Similar resins are prepared by the conventional practice by substantially reacting azelaic acid with essentially its equivalent of diethylene glycol and then adding a small amount of glycerine or pentaerythritol equivalent in amount to that introduced in the above resin by the addition of the glycidyl ester of azelaic acid. By either the process of this invention or by conventional methods the time required to process a resin such as this is relatively long. However, the use of the process of this invention in the manner indicated above does result in the order of 20 to 30% saving of processing time.

*Example 8*

This example illustrated the use of the diglycidyl ester of adipic acid to prepare a plasticizing-type alkyd.

Into a suitable reaction vessel equipped as in Example 1 are charged 146 parts adipic acid, 87.5 parts glycerol and 220 parts of coconut oil fatty acids. This reaction mixture is heated with stirring and under an inert atmosphere to 235° C. Heating is continued at this temperature until an acid number of 20 is obtained. The resin is then cooled to 200° C. and 19 parts of diglycidyl ester of adipic acid are added. Reaction is continued until an acid number 7, viscosity Y at 100% solids are obtained.

The time required to process a resin of this type by the method of this invention is eight hours. By the method of the prior art, the processing time required is about thirteen hours.

*Example 9*

This example illustrates the use of the diglycidyl ether of propylene glycol to prepare an architectural type alkyd similar to that of Example 1.

Into a suitable reaction vessel equipped as in Example 1 are charged 270 parts of refined soya oil and 70 parts of pentaerythritol. This mixture is heated to 230° C. with stirring and under an inert gas atmosphere. A suitable alcoholysis product is made in the usual manner using 0.3 part litharge as catalyst. Thereupon, 148 parts of phthalic anhydride and 86 parts of refined soya fatty acids are added. The temperature is raised to 250° C. and held for acid numer 27. The resin is then cooled to 170° C. and 27 parts of diglycidyl ether of propylene glycol are added. Heating is continued with stirring until acid number 7 and viscosity F at 70% solids in Varsol No. 1.

It can be seen from this example that where a diglycidyl ether of an alkanediol is employed to practice this invention the resultant resins appear to have somewhat different composition from a similar resin made by the prior art practice. This is so because polyhydric alcohols corresponding in structure to the diglycidyl ethers herein employed are not generally available. However, this difference is more apparent than real because the usual processing practices favor a significant amount of etherification of the polyols used. While it cannot be quantitatively shown, it is felt that the particular time-temperature conditions of the process of this invention result in less etherification of polyols as is obtained in the conventional practice. Furthermore, the amount of oxirane compound used in the processes of this invention is a minor amount in comparison with the overall compositions, and moreover, a limited amount of ether linkages introduced in the resinous structure as obtained by using the diglycidyl ether of an alkanediol does not detract from the ultimate resin properties because ether linkages are considerably more stable from a chemical standpoint than are ester-type linkages.

The resin of this example was extensively evaluated and compared with a similar resin made by conventional practice, details of processing and characteristics of which are given in Example 1. This evaluation testing consisted of drying tests, water-resistant tests, solvent-resistance tests, compatibility tests, pigment-grinding tests, and color and gloss retention observations. This evaluation testing indicated no significant difference in any of the properties above stated for the resin of this example and that of the resin in Example 1 referred to.

Perhaps the most critical property of a resin of this type is its air-drying rate. Air drying characteristics were noted for the resin of this example and that of a similar type resin prepared by a prior art process such as shown in Example 1. These data were obtained on 5 mil wet draw-downs of 70% resin solutions on glass. The resin solutions contained the usual amount of drier, namely, .5% lead (as naphthenate) and .05% cobalt (as naphthenate). The results obtained indicated that the two resins possessed comparable drying rates.

*Example 10*

This example illustrates the use of the diglycidyl ether of ethylene glycol to prepare a long-oil resin similar to that of Example 4.

Into a suitable reaction vessel are charged 300 parts linseed oil and 55 parts glycerine. This mixture is heated with agitation and under inert gas atmosphere to 230° C., 0.3 part litharge is then added and the mixture is held until a suitable alcoholysis product is obtained. 148 parts of phthalic anhydride are then added and the mixture heated to 250° C. and held at this temperature until an acid number of 25 is obtained. The resin is then cooled to 190° C. and 18 parts of diglycidyl ether of ethylene glycol are added. The resin is held until an acid number 4 viscosity W at 70% solids in Varsol No. 1 are obtained. The total processing time "at heat" was five and one-half hours which compares with ten hours required by the employment of the prior art process.

*Example 11*

This example illustrates the use of the diglycidyl ether of 2-ethyl, 2-butyl, propanediol-1,3 to prepare a medium oil length resin.

Into a suitable reaction vessel equipped as in Example 1 are charged 148 parts of phthalic anhydride, 65 parts dehydrated castor oil, 153 parts soya fatty acids and 72 parts of glycerol. This mixture is heated with agitation and under nitrogen atmosphere to 250° C. and held until an acid number of 35 is obtained. The resin is then cooled to 170° C. whereupon, 43 parts of diglycidyl ether of 2-ethyl, 2-butyl, propanediol-1,3 are added. Heating is continued until an acid number 8, viscosity X at 50% solids in Varsol No. 1 are obtained. The time required to process this resin was four and one-quarter hours which represents approximately a one-third reduction of time over that required for processing a similar type resin by conventional practice.

*Example 12*

This example illustrates the use of the diglycidyl ether of ethylene glycol to prepare a short-oil alkyd.

Into a suitable reaction vessel equipped as in Example 1 are charged 135 parts of phthalic anhydride, 10 parts maleic anhydride, 155 parts of cottonseed fatty acids, and 72 parts of glycerine. This mixture is heated to 250° C. and held until an acid number of 44 is obtained. Whereupon the resin is cooled to 180° C. and 34 parts of diglycidyl ether of ethylene glycol are added. Heating is continued until an acid number 8, viscosity Z-2 at 65% solids in xylol. The total "at heat" time required was three and three-quarter hours. A similar type resin made by conventional practice required five hours processing time.

*Example 13*

This example illustrates the use of diglycidyl ether of diethylene glycol to prepare a non-drying oil modified plasticizing resin.

Into a suitable reaction vessel are charged 202 parts sebacic acid, 155 parts castor oil, 28 parts glycerine and 50 parts diethylene glycol. This mixture is heated to 235° C. with stirring and under nitrogen atmosphere and held until an acid number 21 is obtained. The resin mixture is then cooled to 190° C. and 19 parts of diglycidyl ether of diethylene glycol are added. Heating is continued until an acid number 4 is obtained. The total time required to process this resin was eight hours compared with eleven hours required for a similar type resin made by conventional practice.

What is claimed is:

1. A process for producing an alkyd resin comprising the steps: (1) esterifying at a temperature in excess of 200° C. a polyhydric alcohol and a polycarboxylic acid free of non-benzenoid unsaturation until an acid number between about 15 and 50 is obtained, said esterification product being substantially free of hydroxyl groups, thereupon, (2) reacting to completion as indicated by an acid number not greater than 13 at a temperature between about 130° C. and 260° C. the esterification product of said step (1) with a glycidyl compound selected from the group consisting of a diglycidyl ether of an alkane diol and a diglycidyl ester of a dicarboxylic acid on the basis of from about 0.5:1.5 equivalents of oxirane oxygen as represented by said glycidyl compound per equivalent of uncondensed carboxyl groups contained by the esterification product of said step (1).

2. A process for producing an alkyd resin comprising the steps: (1) esterifying at a temperature in excess of 200° C. a polyhydric alcohol and a polycarboxylic acid free of non-benzenoid unsaturation until an acid number between about 15 and 50 is obtained, said esterification product being substantially free of hydroxyl groups, thereupon, (2) reacting to completion as indicated by an acid number not greater than 13 at a temperature between about 130° C. and 260° C. the esterification product of said step (1) with a diglycidyl ester of a dicarboxylic acid on the basis of from about 0.5:1.5 equivalents of oxirane oxygen as represented by said ester per equivalent of uncondensed carboxyl groups contained by the esterification product of said step (1).

3. A process for producing an alkyd resin comprising the steps: (1) esterifying at a temperature in excess of 200° C. a polyhydric alcohol and a polycarboxylic acid free of non-benzenoid unsaturation until an acid number between about 15 and 50 is obtained, said esterification product being substantially free of hydroxyl groups, thereupon, (2) reacting to completion as indicated by an acid number not greater than 13 at a temperature between about 130° C. and 260° C. the esterification product of said step (1) with the diglycidyl ester of phthalic acid on the basis of from about 0.5:1.5 equivalents of oxirane oxygen as represented by said ester per equivalent of uncondensed carboxyl groups contained by the esterification product of said step (1).

4. A process for producing an alkyd resin comprising the steps: (1) esterifying at a temperature in excess of 200° C. a dihydric alcohol and an aliphatic dicarboxylic acid until an acid number between about 15 and 50 is obtained, said esterification product being substantially free of hydroxyl groups, thereupon, (2) reacting to completion as indicated by an acid number not greater than 13 at a temperature between about 130° C. and 260° C. the esterification product of said step (1) with a diglycidyl ester of a dicarboxylic acid on the basis of from about 0.5:1.5 equivalents of oxirane oxygen as represented by said ester per equivalent of uncondensed carboxyl groups contained by the esterification product of said step (1).

5. A process for producing an oil-modified alkyd resin comprising the steps: (1) esterifying at a temperature in excess of 200° C. a polyhydric alcohol, a polycarboxylic acid free of non-benzenoid unsaturation and a mono-carboxylic modifier selected from the group consisting of fatty acids having from 8 to 18 carbon atoms and partial polyhydric alcohol esters thereof until an acid number between about 15 and 50 is obtained, said esterification product being substantially free of hydroxyl groups, thereupon, (2) reacting to completion as indicated by an acid number not greater than 13 at a temperature between about 130° C. and 260° C. the esterification product of said step (1) with a diglycidyl ester of a dicarboxylic acid on the basis of from about 0.5:1.5 equivalents of oxirane oxygen as represented by said ester per equivalent of uncondensed carboxyl groups contained by the esterification product of said step (1).

6. A process for producing an oil-modified alkyd resin comprising the steps: (1) esterifying at a temperature in excess of 200° C. a polyhydric alcohol, a polycarboxylic acid free of non-benzenoid unsaturation and a mono-carboxylic modifier selected from the group consisting of fatty acids having from 8 to 18 carbon atoms and partial polyhydric alcohol esters thereof until an acid number between about 15 and 50 is obtained, said esterification product being substantially free of hydroxyl groups, thereupon, (2) reacting to completion as indicated by an acid number not greater than 13 at a temperature between about 130° C. and 260° C. the esterification product of said step (1) with the diglycidyl ester of phthalic acid on the basis of from about 0.5:1.5 equivalents of oxirane oxygen as represented by said ester per equivalent of uncondensed carboxyl groups contained by the esterification product of said step (1).

7. A process for producing an alkyd resin comprising the steps: (1) esterifying at a temperature in excess of 200° C. a polyhydric alcohol and a polycarboxylic acid free of non-benzenoid unsaturation until an acid number between about 15 and 50 is obtained, said esterification product being substantially free of hydroxyl groups, thereupon, (2) reacting to completion as indicated by an acid number not greater than 13 at a temperature between about 130° C. and 260° C. the esterification product of said step (1) with a diglycidyl ether of an alkane diol on the basis of from about 0.5:1.5 equivalents of oxirane oxygen as represented by said diglycidyl ether per equivalent of uncondensed carboxyl groups contained by the esterification product of said step (1).

8. A process for producing an alkyd resin comprising the steps: (1) esterifying at a temperature in excess of 200° C. a polyhydric alcohol and a polycarboxylic acid free of non-benzenoid unsaturation until an acid number between about 15 and 50 is obtained, said esterification product being substantially free of hydroxyl groups, thereupon, (2) reacting to completion as indicated by an acid number not greater than 13 at a temperature between about 130° C. and 260° C. the esterification product of said step (1) with the diglycidyl ether of ethylene glycol on the basis of from about 0.5:1.5 equivalents of oxirane oxygen as represented by said diglycidyl ether per equivalent of uncondensed carboxyl groups contained by the esterification product of said step (1).

9. A process for producing an alkyd resin comprising the steps: (1) esterifying at a temperature in excess of 200° C. a dihydric alcohol and an aliphatic dicarboxylic acid until an acid number between about 15 and 50 is obtained, said esterification product being substantially free of hydroxyl groups, thereupon, (2) reacting to completion as indicated by an acid number not greater than 13 at a temperature between about 130° C. and 260° C. the esterification product of said step (1) with a diglycidyl ether of an alkane diol on the basis of from about 0.5:1.5 equivalents of oxirane oxygen as represented by said digylcidyl ether per equivalent of uncondensed carboxyl groups contained by the esterification product of said step (1).

10. A process for producing an oil-modified alkyd resin comprising the steps: (1) esterifying at a temperature in excess of 200° C. a polyhydric alcohol, a polycarboxylic acid free of non-benzenoid unsaturation and a mono-carboxylic modifier selected from the group consisting of fatty acids having from 8 to 18 carbon atoms and partial polyhydric alcohol esters thereof until an acid number between about 15 and 50 is obtained, said esterification product being substantially free of hydroxyl groups, thereupon, (2) reacting to completion as indicated by an acid number not greater than 13 at a temperature between about 130° C. and 260° C. the esterification product of said step (1) with a diglycidyl ether of an alkane diol on the basis of from about 0.5:1.5 equivalents of oxirane oxygen as represented by said ether per equivalent of uncondensed carboxyl groups contained by the esterification product of said step (1).

11. A process for producing an oil-modified alkyd resin comprising the steps: (1) esterifying at a temperature in excess of 200° C. a polyhydric alcohol, a polycarboxylic acid free of non-benzenoid unsaturation and a mono-carboxylic modifier selected from the group consisting of fatty acids having from 8 to 18 carbon atoms and partial polyhydric alcohol esters thereof until an acid number between about 15 and 50 is obtained, said esterification product being substantially free of hydroxyl groups, thereupon, (2) reacting to completion as indicated by an acid number not greater than 13 at a temperature between about 130° C. and 260° C. the esterification product of said step (1) with a diglycidyl ether of ethylene glycol on the basis of from about 0.5:1.5 equivalents of oxirane oxygen as represented by said diglycidyl ether per equivalent of uncondensed carboxyl groups contained by the esterification product of said step (1).

12. A process for producing an oil-modified alkyd resin comprising the steps: (1) esterifying a polyhydric alcohol having in excess of two hydroxyl groups, a polycarboxylic acid free of non-benzenoid unsaturation and a mono-carboxylic modifier selected from the group consisting of fatty acids having from 8 to 18 carbon atoms and partial polyhydric alcohol esters thereof, until an acid number between about 15 and 50 is obtained, said esterification product being substantially free of hydroxyl groups, thereupon (2) reacting to completion as indicated by an acid number not greater than 13 at a temperature between about 130° C. and 260° C. the esterification product of said step (1) with a diglycidyl ether of a diol represented by the formula $$HOCH_2RCH_2OH$$

wherein R is an alkylidene group having not more than 6 carbon atoms on the basis of from about 0.5:1.5 equivalents of oxirane oxygen as represented by said diglycidyl ether per equivalent of uncondensed carboxyl groups contained by the esterification product of said step (1).

13. A process for producing an alkyd resin comprising the steps: (1) esterifying at a temperature in excess of 200° C. a polyhydric alcohol, a polycarboxylic acid free of non-benzenoid unsaturation and a mono-carboxylic modifier selected from the group consisting of fatty acids having from 8 to 18 carbon atoms and partial polyhydric alcohol esters thereof until an acid number between about 15 and 50 is obtained, said esterification product being substantially free of hydroxyl groups, thereupon, (2) reacting to completion as indicated by an acid number not greater than 13 at a temperature between about 130° C. and 260° C. the esterification product of said step (1) with the diglycidyl ether of propanediol 1—3 on the basis of from about 0.5:1.5 equivalents of oxirane oxygen as represented by said diglycidyl ether per equivalent of uncondensed carboxyl groups contained by the esterification product of said step (1).

References Cited in the file of this patent

UNITED STATES PATENTS

| | | |
|---|---|---|
| 2,683,131 | Cass | July 6, 1954 |
| 2,687,398 | McLean | Aug. 24, 1954 |
| 2,691,004 | Doyle | Oct. 5, 1954 |
| 2,873,204 | Hocule et al. | Feb. 10, 1959 |
| 2,910,455 | Christenson et al. | Oct. 27, 1959 |

FOREIGN PATENTS

| | | |
|---|---|---|
| 758,433 | Great Britain | Oct. 3, 1956 |